(12) United States Patent
Taniguchi et al.

(10) Patent No.: US 11,719,291 B2
(45) Date of Patent: Aug. 8, 2023

(54) ONE-WAY COUPLING

(71) Applicant: TOYOTA BOSHOKU KABUSHIKI KAISHA, Aichi (JP)

(72) Inventors: Kosuke Taniguchi, Aichi (JP); Wataru Sakaguchi, Aichi (JP); Yasuaki Suzuki, Aichi (JP); Masashi Hiroshima, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 18/074,810

(22) Filed: Dec. 5, 2022

(65) Prior Publication Data

US 2023/0175558 A1 Jun. 8, 2023

(30) Foreign Application Priority Data

Dec. 6, 2021 (JP) .................. 2021-197666

(51) Int. Cl.
*F16D 41/063* (2006.01)
*B60N 2/02* (2006.01)
*F16D 125/66* (2012.01)
*F16D 125/28* (2012.01)
*F16D 121/24* (2012.01)

(52) U.S. Cl.
CPC ......... *F16D 41/063* (2013.01); *B60N 2/0232* (2013.01); *F16D 2121/24* (2013.01); *F16D 2125/28* (2013.01); *F16D 2125/66* (2013.01)

(58) Field of Classification Search
CPC ............... F16D 41/063; F16D 2121/24; F16D 2125/28; F16D 2125/66; B60N 2/0232

USPC ....................................................... 192/41 R
See application file for complete search history.

(56) References Cited

U.S. PATENT DOCUMENTS

| 3,236,345 A | * | 2/1966 | Dietz .................... F16D 41/063 |
| | | | 192/41 R |
| 4,989,705 A | * | 2/1991 | Kashio .................. F16D 41/067 |
| | | | 192/41 R |
| 2010/0320054 A1 | * | 12/2010 | D'Eredita ............. F16D 41/064 |
| | | | 192/41 R |
| 2019/0101172 A1 | * | 4/2019 | Ince ....................... B60K 23/08 |

FOREIGN PATENT DOCUMENTS

JP 2001-28863 1/2001

* cited by examiner

*Primary Examiner* — Colby M Hansen
(74) *Attorney, Agent, or Firm* — Greenblum & Bernstein, P.L.C.

(57) ABSTRACT

The present disclosure discloses one example of a one-way coupling that eliminates the need for a component corresponding to a guide piece. The one-way coupling of the present discloser includes an input shaft and an output shaft, and is configured to transmit a drive force from the input shaft to the output shaft, and inhibit the drive force inputted to the output shaft from being transmitted to the input shaft. The one-way coupling includes: a transmitter; an immovable ring; a pressure-contact cam; a first wedge member displaceable between a locked position and an unlocked position, and receiving a pressing force from the pressure-contact cam when the drive force is inputted to the input shaft, and thereby the first wedge member is displaced to the locked position; and a first holder holding an arrangement of the first wedge member when the drive force is inputted to the output shaft.

8 Claims, 15 Drawing Sheets

ONE-WAY COUPLING

CROSS-REFERENCE TO RELATED APPLICATIONS

This application claims the benefit of Japanese Patent Application No. 2021-197666 filed on Dec. 6, 2021 with the Japan Patent Office, the disclosure of which is incorporated herein by reference.

BACKGROUND

The present disclosure relates to a one-way coupling capable of inhibiting a drive force inputted to an output shaft from being transmitted to an input shaft.

For example, Japanese Unexamined Patent Application Publication No. 2001-28863 (hereinafter, referred to as "Patent Document 1") discloses, as a one-way coupling, a clutch employing a rolling element such as a steel ball. The clutch is configured to bring the rolling element into pressure contact with a cylindrical clutch housing when a drive force is inputted to a worm shaft, to stop rotation of the worm shaft, and thereby to block transmission of the drive force from the worm shaft to a rotational shaft.

SUMMARY

Specifically, the clutch disclosed in Patent Document 1 includes a guide piece. The guide piece has a function of holding an arrangement of the rolling elements when the rolling element is brought into pressure contact with the clutch housing.

The present disclosure discloses one example of a one-way coupling that eliminates the need for a component corresponding to a guide piece.

One aspect of the present disclosure provides a one-way coupling comprising: an input shaft to which a drive force is inputted; and an output shaft that outputs the drive force, wherein the one-way coupling is configured to transmit the drive force from the input shaft to the output shaft, and inhibit the drive force inputted to the output shaft from being transmitted to the input shaft. Preferably, the one-way coupling further comprises, for example, at least one of the following constituent elements.

Specifically, the constituent elements include a transmitter, an immovable ring, a pressure-contact cam, a first wedge member, and a first holder. The transmitter comprises an input-side protrusion rotating integrally with the input shaft, and an output-side protrusion rotating integrally with the output shaft. The transmitter is configured to engage the input-side protrusion and the output-side protrusion with each other when the drive force is inputted to the input shaft, thereby to transmit the drive force from the input shaft to the output shaft. The immovable ring is configured to be held in a non-rotatable state. The pressure-contact cam is configured to rotate integrally with the output shaft. The first wedge member is configured to be displaceable between a locked position and an unlocked position. The first wedge member is brought into pressure contact with a circumferential surface of the immovable ring at the locked position, and the pressure contact being released at the unlocked position. The first wedge member is configured to receive a pressing force from the pressure-contact cam when the drive force is inputted to the input shaft, and thereby the first wedge member is displaced to the locked position. The first holder is provided to the first wedge member, and configured to hold an arrangement of the first wedge member when the drive force is inputted to the output shaft.

In the one-way coupling, the first holder for holding arrangement of the first wedge member is provided to the first wedge member. This achieves elimination of a component corresponding to the guide piece As an example, the one-way coupling may be configured as described below.

The first holder may be configured to be latched on the input shaft, thereby to hold the arrangement of the first wedge member when the drive force is inputted to the output shaft.

Specifically, it is preferable that the first holder is formed in a shape of a bicycle front fork, and comprises a first fork blade and the second fork blade to interpose the input shaft therebetween, the first fork blade being situated on one side of the input shaft in a radial direction, the second fork blade being situated on the other side of the input shaft in the radial direction. The radial direction may be understood as a direction parallel to a diametrical direction of the immovable ring.

The one-way coupling comprises a joining portion that couples a leading end of the first fork blade and a leading end of the second fork blade. This can inhibit great deformation of the first fork blade and the second fork blade.

Preferably, at least one of the first fork blade and the second fork blade is slidable on the input shaft in the radial direction, and a gap dimension between the joining portion and a portion opposite thereto is greater than an external dimension of the input shaft, the input shaft being interposed therebetween. Accordingly, inhibition of displacement of the first wedge member can be reduced.

Preferably, the input-side protrusion comprises an open cam that comes into contact with the first wedge member when the drive force is inputted to the input shaft, and thereby the first wedge member is displaced to the unlocked position.

Preferably, the one-way coupling further comprises a second wedge member arranged on a side opposite to the first wedge member to interpose the input shaft, and a second holder provided to the second wedge member, the first holder and the second holder partly overlapping with each other in an axial direction of the input shaft.

In a hypothetical structure, two wedge members are configured to each have the first fork blade and the second fork blade such that leading ends of the respective first fork blades abut each other and also that extending ends of the respective second fork blades abut each other, dimensions of the first fork blade and the second fork blade in an extending direction each have to be made small.

As a result, in the hypothetical structure, when the two wedge members are displaced to the locked position, one of two holders of the two wedge members may be spaced apart from the input shaft.

In contrast, in the one-way coupling of the present disclosure, the first holder and the second holder partly overlap with each other in the axial direction. Accordingly, when the two wedge members are displaced to the locked position, one of the two holders are inhibited from being spaced apart from the input shaft.

Preferably, in the one-way coupling of present disclosure, the output-side protrusion and the pressure-contact cam are formed integrally with the output shaft, the output shaft comprising a circular hole into which the input shaft is rotatably inserted, wherein the input-side protrusion is provided to a drive ring that rotates integrally with the input shaft, the drive ring comprising an engagement hole, the input shaft passing through the engagement hole to be engaged with the engagement hole, and wherein an engagement surface defining the engagement hole is substantially perpendicular in a displacement direction of the first wedge member.

In light of the above, in a state in which inhibition of displacement of the first wedge member is reduced, the drive ring can be rotated integrally with the input shaft.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

Figure 1:
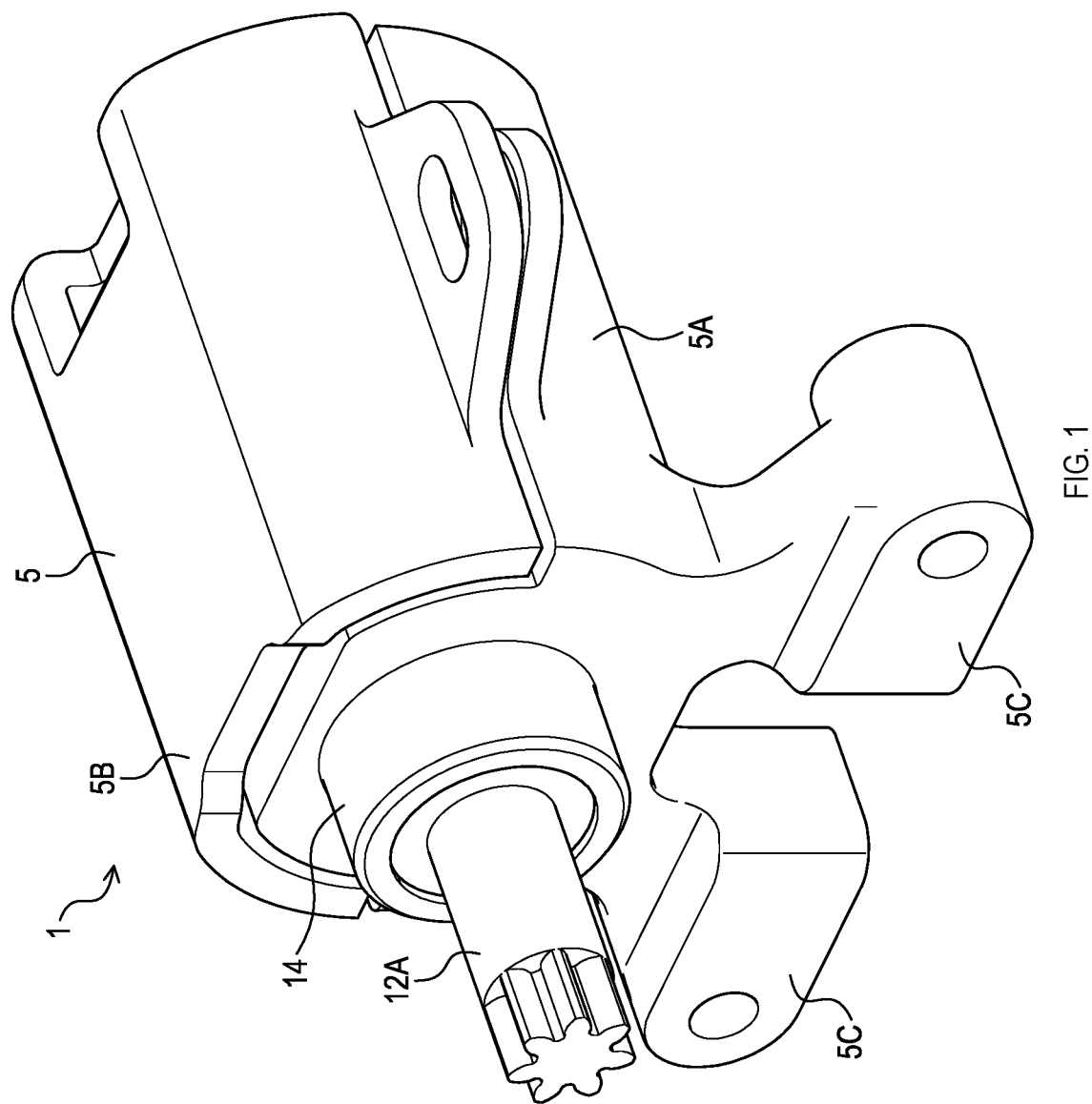
FIG. 1 is a diagram of an actuator in a first embodiment.

An embodiment described hereinafter is one example of embodiments within the scope of the accompanying claims. Matters specifying the invention that are recited in the claims are not limited to any specific configuration, structure, or the like that is shown in the embodiments described below.

The present embodiment is an example where a one-way coupling of the present disclosure is applied to a seat to be mounted on a vehicle, such as an automobile (hereinafter referred to as a "vehicle seat"). Arrows indicating directions, diagonal lines, and others in the drawings are shown so as to facilitate understanding of mutual relationships among the drawings, components, shapes thereof, and the like.

The one-way coupling is not limited by the directions shown in the drawings. The directions shown in the drawings correspond to directions in a state where the vehicle seat of the present embodiment is assembled in a vehicle. The drawings with diagonal lines provided thereon are not necessarily sectional views.

At least in respect of a member or a portion that is labelled with a reference numeral for explanations, there is at least one in number of such a member, part, or portion unless the number is otherwise specified, for example, as "only one of". In other words, there may be two or more of such a member, a part, or a portion when the number is not specified. The one-way coupling in the present disclosure comprises at least constituent elements, such as members, parts, or portions described with reference numerals, and structural portions illustrated in the drawings.

First Embodiment

1. Overview of One-Way Coupling

The present embodiment is described as an example in which a one-way coupling 10 (see FIG. 2) of the present embodiment is applied to an actuator 1 (see FIG. 1) used in a vehicle seat. The actuator 1 generates a drive force for displacing a movable portion of a vehicle seat.

The movable portion of the vehicle seat indicates, for example, a lifting arm for moving a seat cushion up and down, a tilt arm for moving a front end side of the seat cushion up and down, a recliner for displacing a seatback, and the like.

1.1 Schematic Configuration of Actuator

Figure 2:
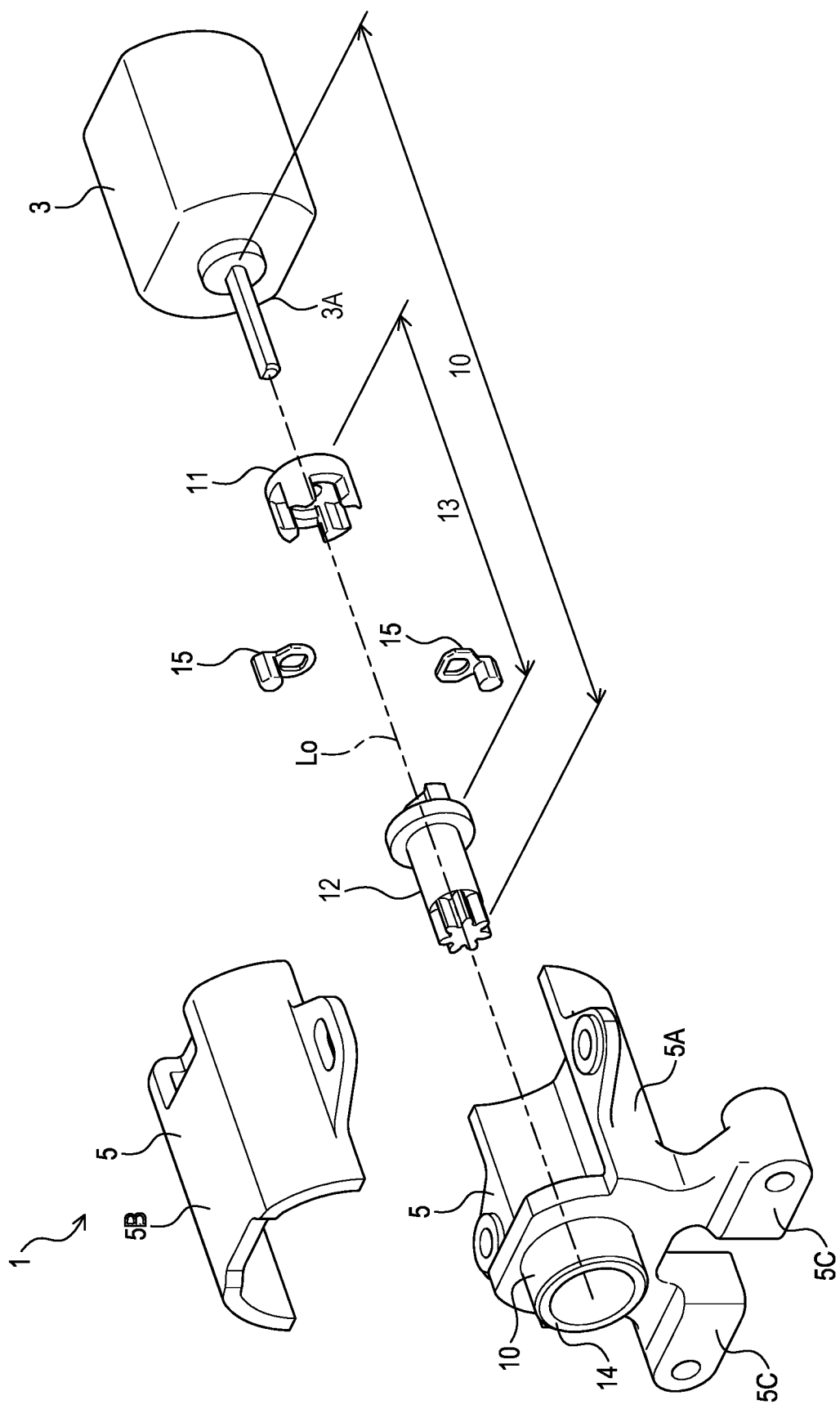
FIG. 2 is an exploded view of the actuator in the first embodiment.

As shown in FIG. 2, the actuator 1 comprises an electric motor 3, the one-way coupling 10, and a housing 5. The electric motor 3 generates a drive force. The housing 5 accommodates the electric motor 3 and the one-way coupling 10.

The housing 5 comprises a first housing 5A and a second housing 5B. The first housing 5A and the second housing 5B hold the electric motor 3 arranged therebetween. The first housing 5A and the second housing 5B are coupled by a fastener (not shown), such as a screw.

The first housing 5A comprises at least one fixed part 5C (a plurality of fixed parts 5C in the present embodiment). Each fixed part 5C is a part for fixing the actuator 1 to an immovable portion, for example, a seat frame (not shown).

1.2 Details of One-Way Coupling

The one-way coupling 10 is a coupling capable of performing a transmission function and a blocking function. The transmission function indicates a function of transmitting the drive force from the electric motor 3 to the movable portion of the vehicle seat. The blocking function indicates a function of blocking transmission of a rotational force (hereinafter, referred to as "reverse rotational force") from the movable portion to the electric motor 3.

As shown in FIG. 2, the one-way coupling 10 comprises an input shaft 3A, an input-side rotation portion 11, an output-side rotation portion 12, a transmitter 13, an immovable ring 14, and at least one wedge member 15. The immovable ring 14 is formed integrally with the first housing 5A.

<Input Shaft and Input-Side Rotation Portion>

The input shaft 3A is a shaft to which the drive force from the electric motor 3 is inputted. A rotor shaft of the electric motor 3 is used as the input shaft 3A. The input-side rotation portion 11 is one example of a drive ring that rotates integrally with the input shaft 3A.

Figure 3:
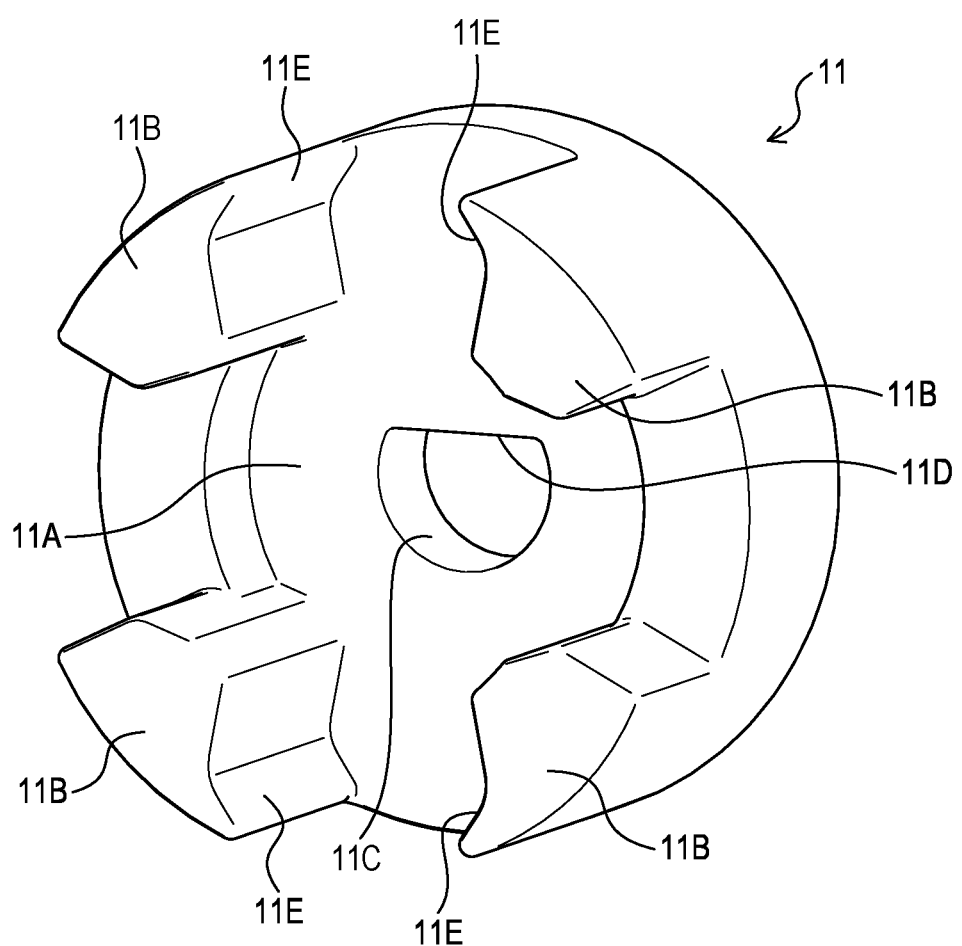
FIG. 3 is a diagram of an input-side rotation portion in the first embodiment.

As shown in FIG. 3, the input-side rotation portion 11 comprises a joint part 11A and at least one input-side protrusion 11B (a plurality of input-side protrusions 11B in the present embodiment). The joint part 11A is coupled to the input shaft 3A, and rotates integrally with the input shaft 3A.

The joint part 11A includes an engagement hole 11C into which the input shaft 3A is inserted. On an inner perimeter surface of the engagement hole 11C, an engagement surface 11D is provided, and engages with an engaging surface 3B (see FIG. 11) provided on the input shaft 3A. Thus, the engagement hole 11C of the present embodiment is formed as a substantially D-shaped hole.

Each input-side protrusion 11B with the joint part 11A rotates about the input shaft 3A. The input-side protrusion 11B is provided on an outer peripheral part of the joint part 11A having a substantially disk-shape. Further, the input-side protrusion 11B protrudes from the outer peripheral part along a direction parallel to the input shaft 3A.

The input-side protrusion 11B is formed as one component integrally with the joint part 11A. Thus, the input-side protrusion 11B integrally with the input shaft 3A rotate about the input shaft 3A.

<Output-Side Rotation Portion>

Figure 4:
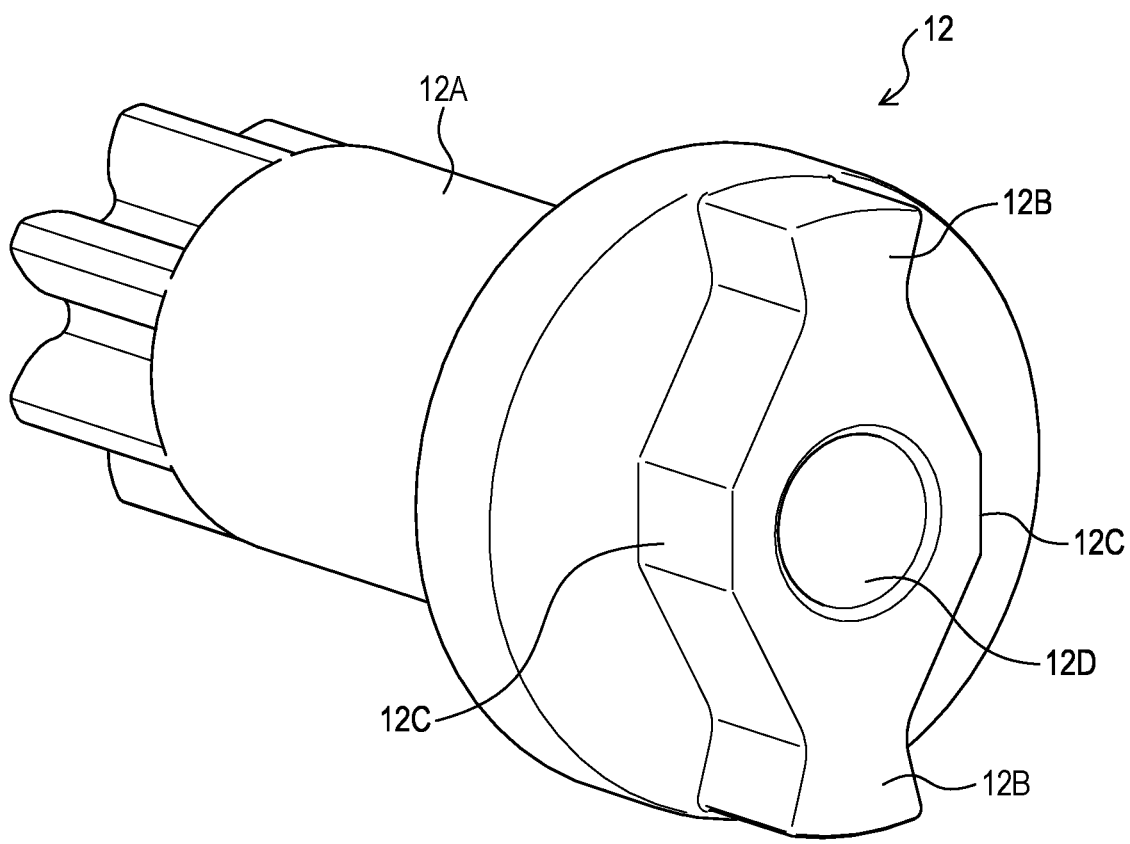
FIG. 4 is a diagram of an output-side rotation portion in the first embodiment.

The output-side rotation portion 12 transmits, to a movable portion, the drive force inputted to the input-side rotation portion 11. As shown in FIG. 4, the output-side rotation portion 12 comprises an output shaft 12A, at least one output-side protrusion 12B (a plurality of output-side protrusions 12B in the present embodiment), and at least one pressure-contact cam 12C (a plurality of pressure-contact cams 12C in the present embodiment).

The output shaft 12A engages with the movable portion to supply the drive force to the movable portion. Each output-side protrusion 12B is a protrusion that rotates about the output shaft 12A and protrudes toward the input-side protrusions 11B along a direction parallel to an axial direction of the output shaft 12A.

Each pressure-contact cam 12C comprises a pressing portion for pressing a corresponding one of the at least one wedge member 15. The output shaft 12A, the output-side protrusions 12B, and the pressure-contact cams 12C are formed integrally with each other. Thus, in accordance with rotation of the output-side protrusions 12B, the output shaft 12A rotates. Conversely, in accordance with rotation of the output shaft 12A, the pressure-contact cams 12C rotates about the output shaft 12A and is displaced.

The input shaft 3A, the input-side rotation portion 11, and the output-side rotation portion 12 are coaxially arranged such that a rotation center axis Lo (see FIG. 2) thereof is identical. The output-side rotation portion 12 comprises an insertion hole 12D having a circular shape into which the input shaft 3A is inserted.

The insertion hole 12D does not have its engagement surface for engaging with an engaging surface of the input shaft 3A. Accordingly, the drive force is not directly transmitted between the input shaft 3A and the output-side rotation portion 12.

<Transmitter>

Figure 6:
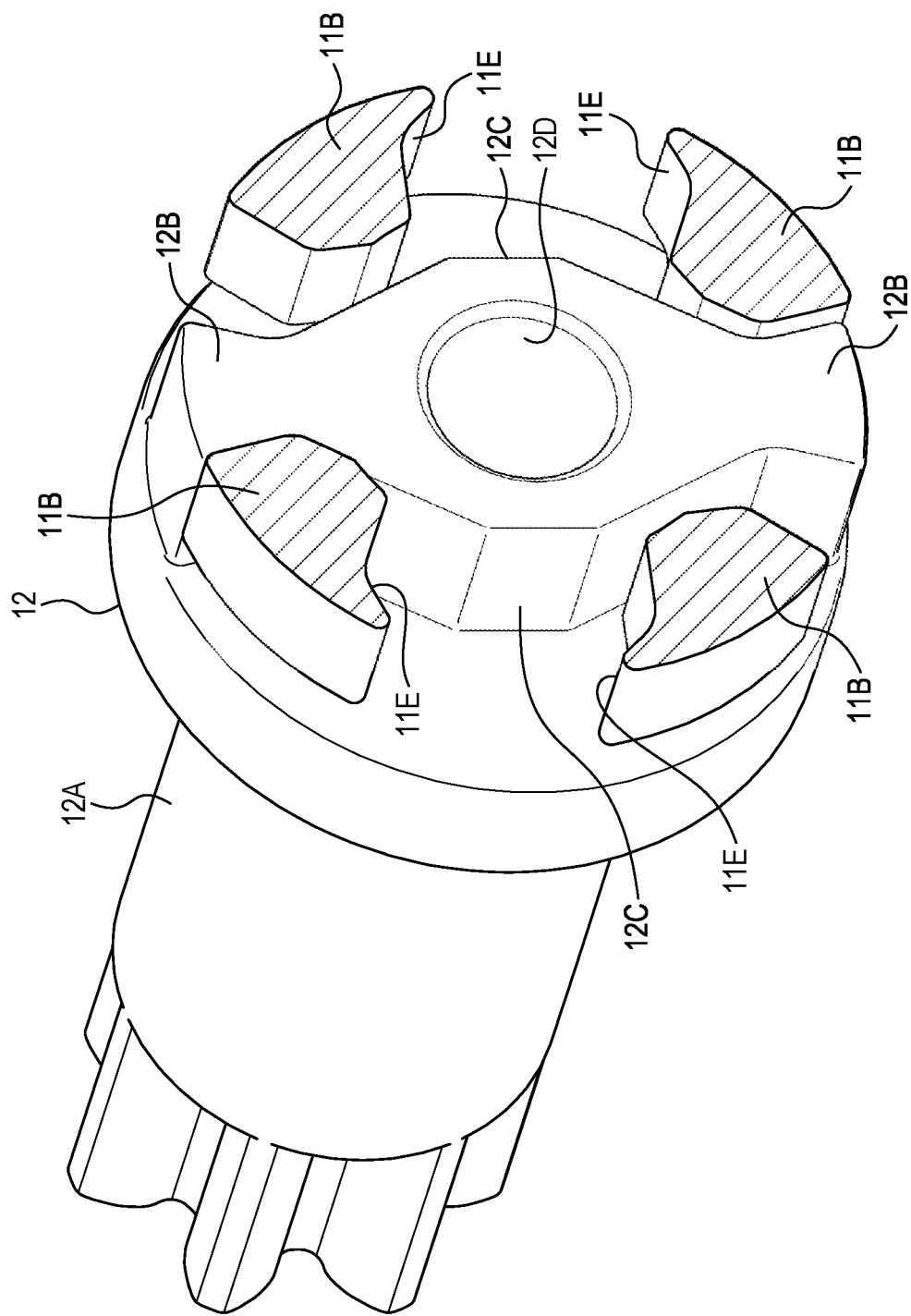
FIG. 6 is a diagram showing the output-side rotation portion, the input-side protrusion, and the output-side protrusion, in the first embodiment.

The transmitter 13 comprises the input-side protrusion 11B and the output-side protrusion 12B. When the drive force is inputted to the input-side rotation portion 11, the input-side protrusion 11B and the output-side protrusion 12B are engaged, as shown in FIG. 6. Thus, the drive force inputted to the input-side rotation portion 11 is transmitted from the input-side rotation portion 11 to the output-side rotation portion 12.

In the present embodiment, each of the input-side protrusion 11B and the output-side protrusion 12B has a corresponding contact surface. The contact surface is set such that an imaginary tangent line L1 (see FIG. 8) of contact sections of the input-side protrusion 11B and the output-side protrusion 12B passes through the rotation center axis Lo of the input shaft 3A.

<Immovable Ring>

Figure 5:
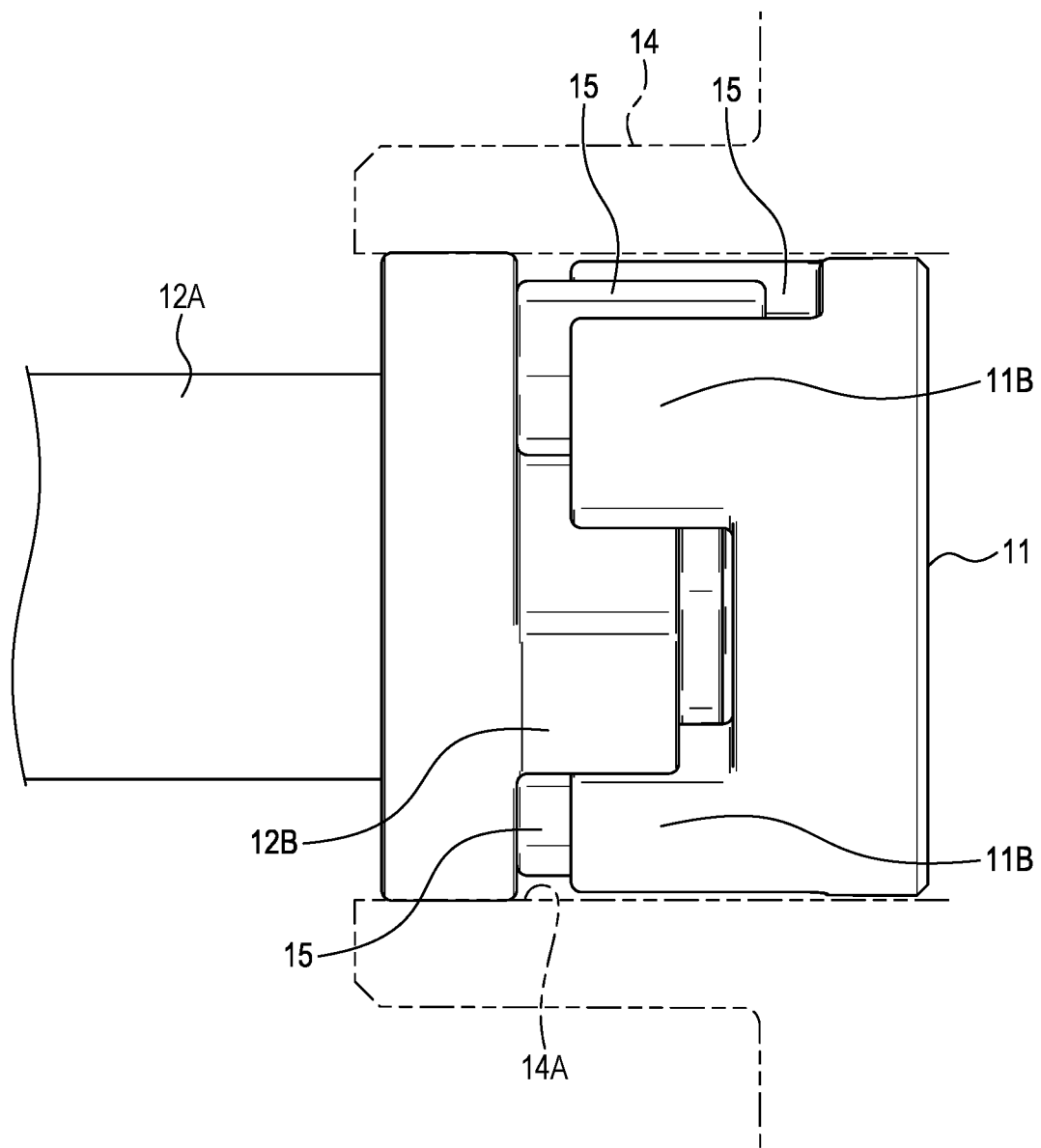
FIG. 5 is a diagram of a one-way coupling in the first embodiment.

The immovable ring 14 is an annular member held in a non-rotatable state (see FIG. 2). The input-side protrusion 11B, the output-side protrusion 12B, and the at least one wedge member 15 are accommodated in the immovable ring 14 (see FIG. 5).

<Wedge Member>

As shown in FIG. 2, the one-way coupling 10 comprises a plurality of wedge members 15. Each wedge member 15 of the plurality wedge members 15 is shaped to be substantially congruent. Two wedge members 15 in FIG. 2 are arranged with rotational symmetry with respect to the rotation center axis Lo.

Figure 7:
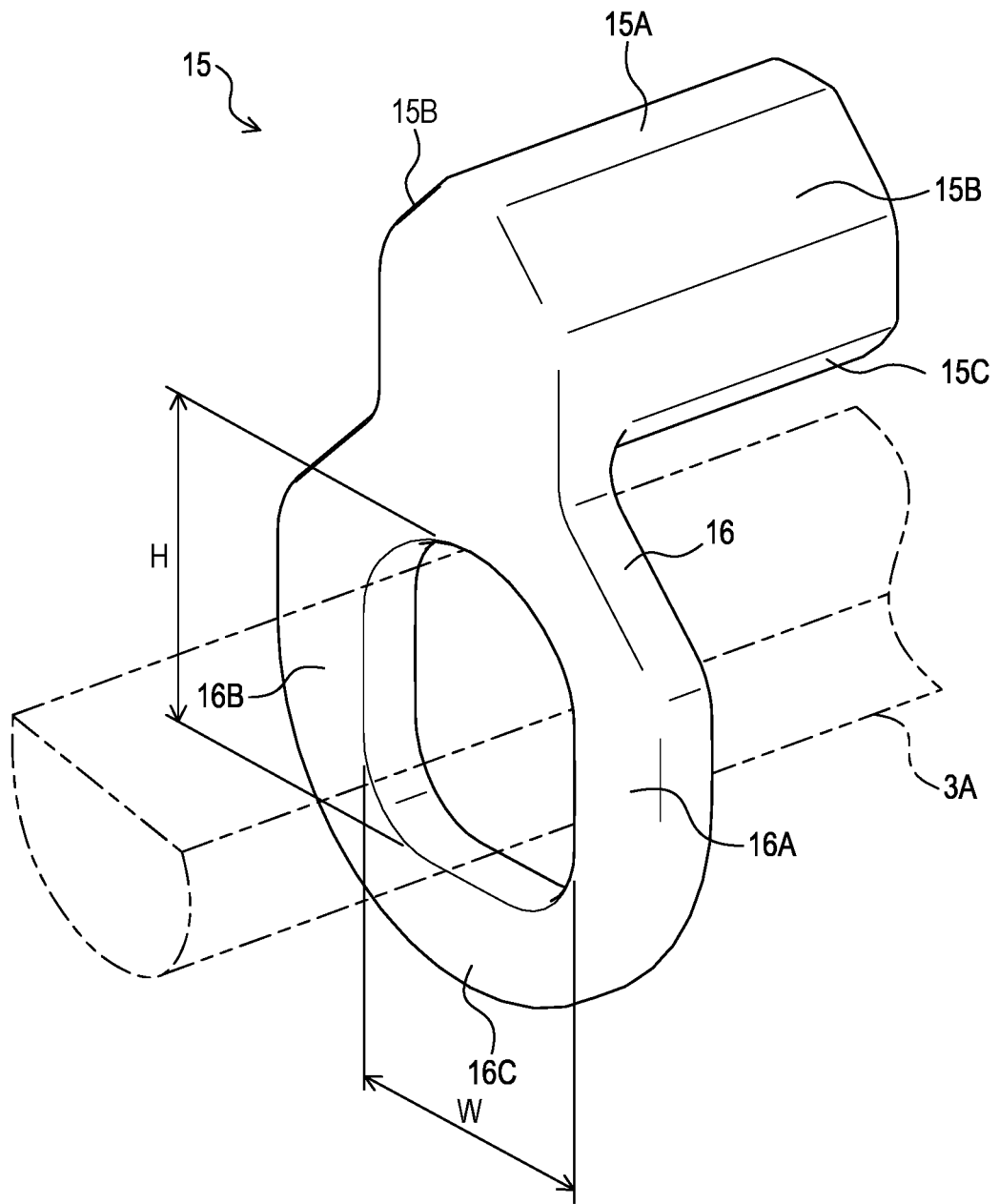
FIG. 7 is a diagram of a wedge member in the first embodiment.

As shown in FIG. 7, each wedge member 15 is a non-rolling element. The wedge member 15 comprises a pressure contact portion 15A, a first follower part 15B, a second follower part 15C, and a holder 16. Each wedge member 15 is configured as a non-spherical or non-cylindrical member.

The pressure contact portion 15A is a curved surface that is in pressure contact with a circumferential surface of the immovable ring 14 when the blocking function is performed. The pressure contact portion 15A is brought into pressure contact with an inner circumferential surface 14A (see FIG. 5). Each wedge member 15 is displaced between a locked position (see FIG. 9) and an unlocked position (see FIG. 8). At the locked position, the pressure contact portion 15A is in pressure contact with the inner circumferential surface 14A. At an unlocked position, the pressure contact portion 15A is positioned such that such pressure contact is released.

Herein, "pressure contact is released" indicates, for example, a state in which the pressure contact portion 15A and the inner circumferential surface 14A are not in contact with each other, or a state in which the pressure contact portion 15A and the inner circumferential surface 14A are in contact with each other to an extent such that the contact surface pressure is considered to be zero.

Figure 10:
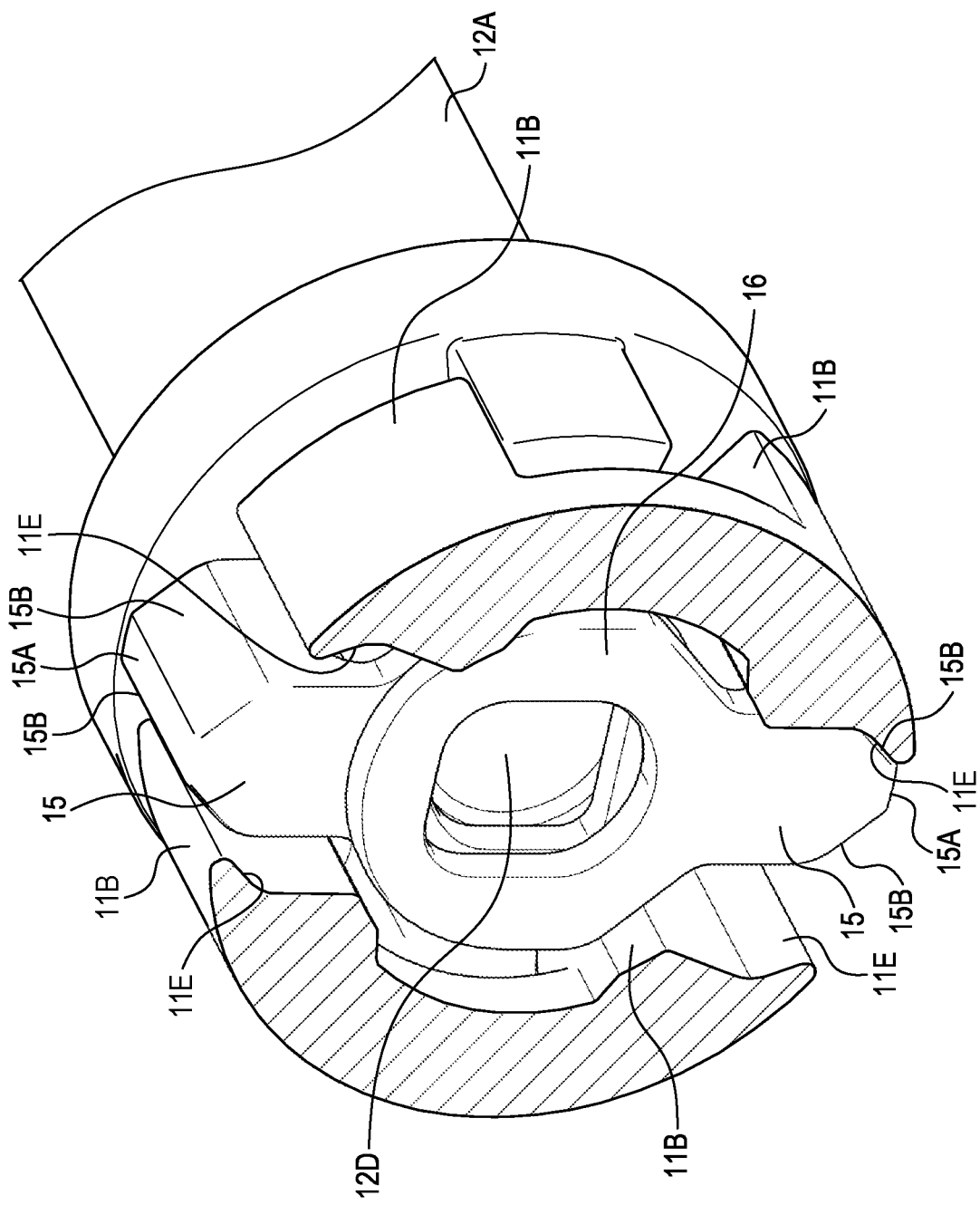
FIG. 10 is a diagram of the wedge member and others in the first embodiment.

As shown in FIG. 10, the input-side protrusions 11B comprise respective open cams 11E. Each open cam 11E is configured as a tilted surface so as to come into contact with the first follower part 15B from a circumferential direction when the drive force is inputted to the input-side rotation portion 11.

Each open cam 11E is provided on a surface opposite to the contact surface of the input-side protrusion 11B in contact with the corresponding output-side protrusion 12B in the circumferential direction. The circumferential direction indicates a direction parallel to the circumferential direction of the immovable ring 14.

Figure 8:
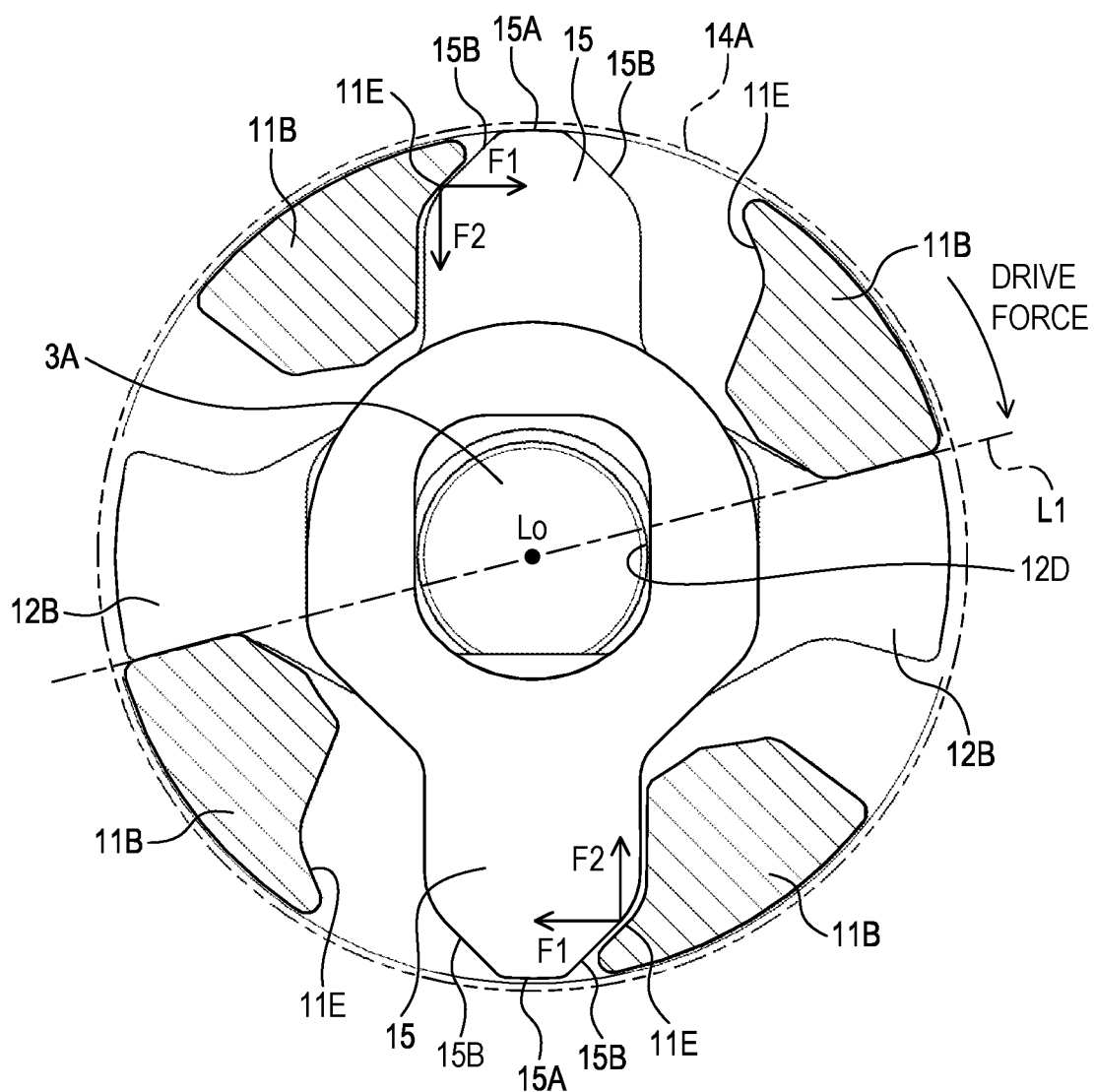
FIG. 8 is a diagram showing a structure of the one-way coupling in the first embodiment, in a state in which a drive force is inputted to the input-side rotation portion.

As shown in FIG. 8, the two tilted surfaces constituting the first follower part 15B each have two features below:
A surface is tilted in a radial direction; and
A flat face or a curved surface is tilted such that a gap between the two tilted surfaces becomes smaller as the two tilted surfaces each are closer to the inner circumferential surface 14A.

Herein, the radial direction indicates a direction parallel to a diametrical direction of the immovable ring 14.

When the drive force acts on the input-side rotation portion 11, and any of the input-side protrusions 11B come into contact with a corresponding one or more of the output-side protrusions 12B, any of the open cams 11E of the non-contact input-side protrusions 11B comes into contact with the first follower parts 15B.

This causes the first follower part 15B to receive a pressing force F1 from open cam 11E, thereby to generate a force for displacing the wedge member 15 to the unlocked position. That is, this force indicates a force F2 for displacing the wedge member 15 such that the wedge member 15 is spaced apart from the inner circumferential surface 14A.

In other words, the first follower part 15B is formed by a surface having two features below:

A surface is tilted in the circumferential direction; and

A surface that generates the force F2 for displacing the pressure contact portion 15A to the unlocked position when the pressing force F1 is received from the open cam 11E.

Figure 9:
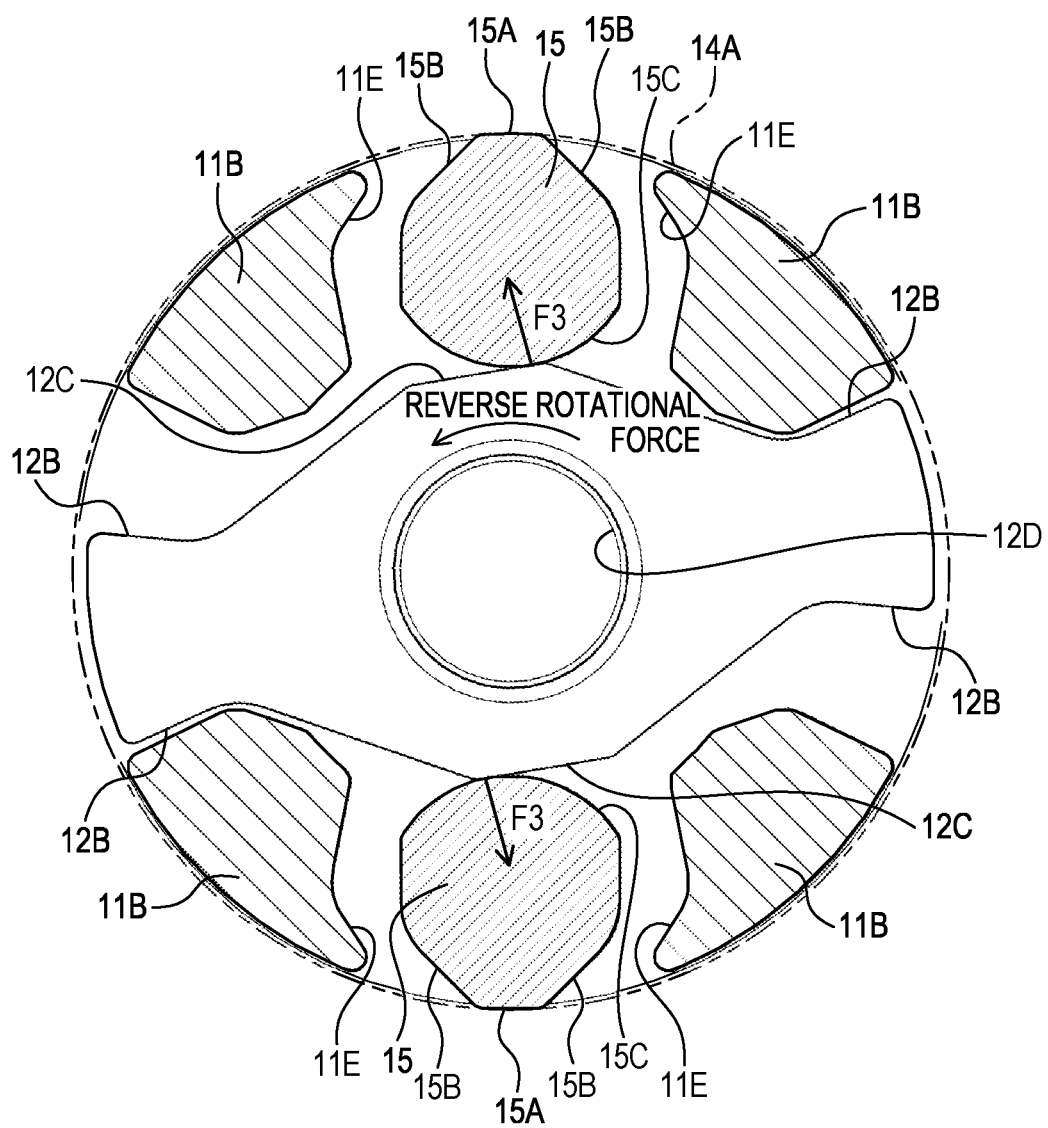
FIG. 9 is a diagram showing a structure of the one-way coupling in the first embodiment, in a state in which a reverse rotational force is inputted to the output-side rotation portion.

As shown in FIG. 7, the second follower part 15C is at a position shifted from the first follower part 15B. As shown in FIG. 9, when the reverse rotational force is inputted to the output-side rotation portion 12, the second follower part 15C receives a pressing force F3 from the pressure-contact cam 12C, thereby to displace the wedge member 15 to the locked position.

<Holder>

The holder 16 provided to each wedge member 15 performs the holding function for holding an arrangement of the wedge member 15, when the reverse rotational force is inputted to the output shaft 12A, that is, when the drive force is inputted to the output shaft 12A. Specifically, the holder 16 is formed, for example, in a shape of a bicycle front fork, as shown in FIG. 7.

The holder 16 comprises a first fork blade 16A, a second fork blade 16B, and a joining portion 16C. The first fork blade 16A is disposed in one side of the input shaft 3A in a radial direction, and also extends in a direction away from the pressure contact portion 15A.

The second fork blade 16B is disposed in the other side of the input shaft 3A in the radial direction, and extends in a direction away from the pressure contact portion 15A and parallel to the first fork blade 16A. Thus, the input shaft 3A is held by the first fork blade 16A and the second fork blade 16B in the radial direction.

Figure 11:
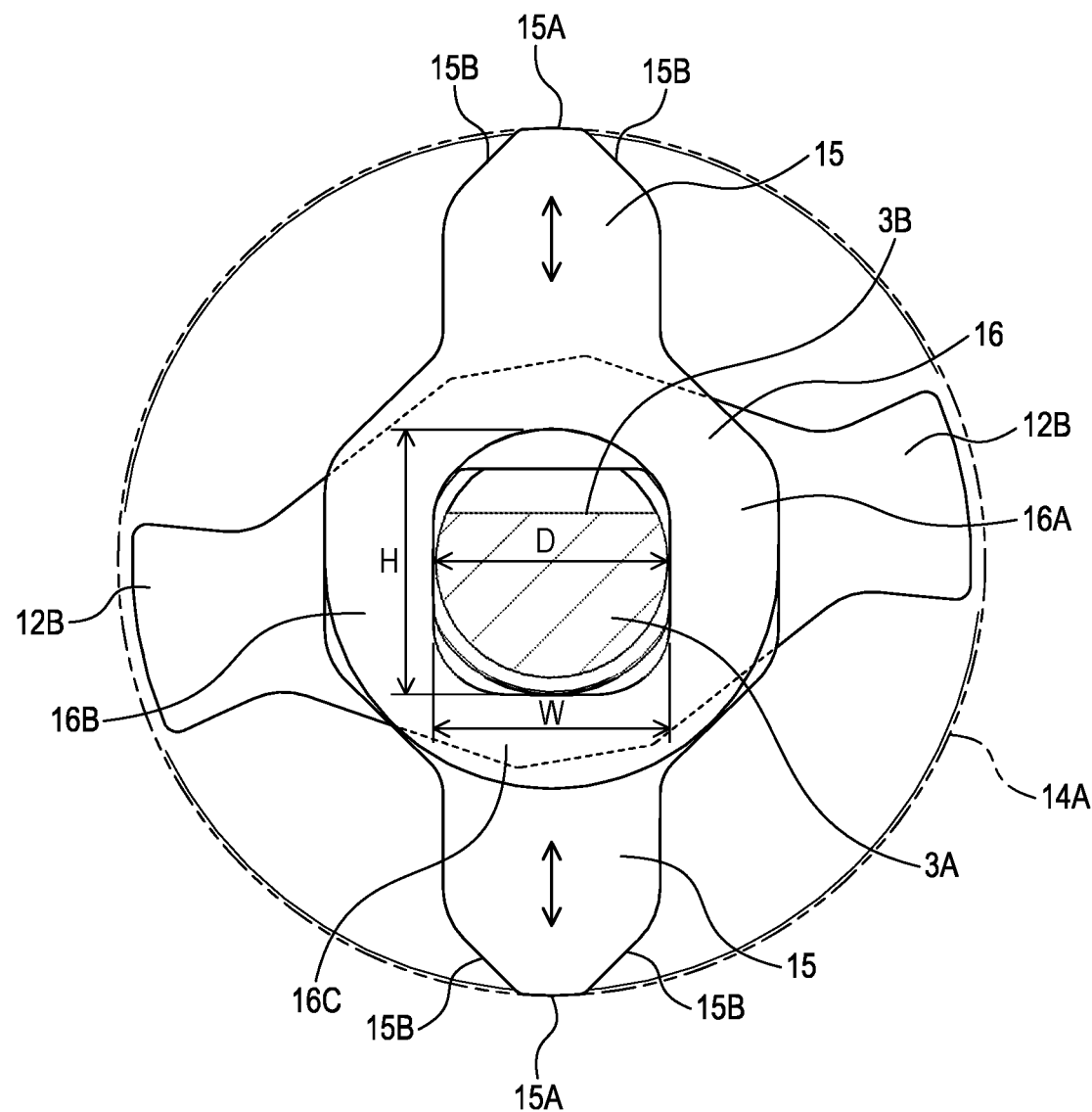
FIG. 11 is a diagram of the wedge member and others in the first embodiment.

The joining portion 16C couples a leading end of the first fork blade 16A and a leading end of the second fork blade 16B. In other words, as shown in FIG. 11, the holder 16 of the present embodiment comprises an annular body that surrounds a circumference of the input shaft 3A.

Further, at least one of the first fork blade 16A and the second fork blade 16B is slidable on the input shaft 3A in the radial direction. Specifically, a spacing dimension W between the first fork blade 16A and the second fork blade 16B is the same as a diameter D of the input shaft 3A, or slightly greater than the diameter D.

A gap dimension H is greater than an external dimension of the input shaft 3A, specifically, the diameter D. The gap dimension H is a distance between the joining portion 16C and a portion opposite thereto, interposing the input shaft 3A therebetween. Specifically, the gap dimension H is a dimension, out of a hole dimension of the annular body, of a portion that extends in a direction parallel to the first fork blade 16A.

Figure 12:
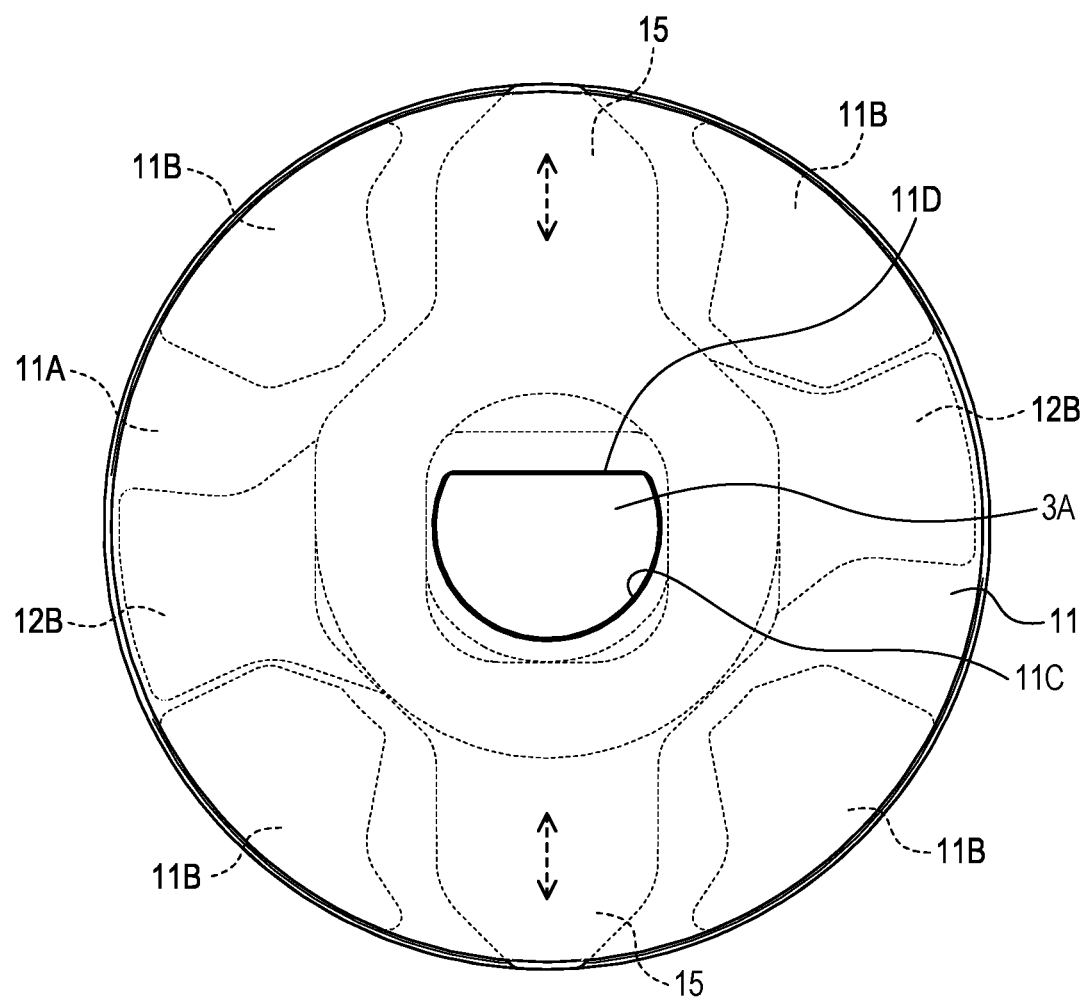
FIG. 12 is a diagram of the wedge member and others in the first embodiment.

Each wedge member 15 is thus displaceable to the direction parallel to an extending direction of the first fork blade 16A. Further, as shown in FIG. 12, the engagement surface 11D defining the engagement hole 11C is substantially perpendicular to a displacement direction of each wedge member 15 (see arrow directions of FIG. 11 to FIG. 13).

Figure 13:
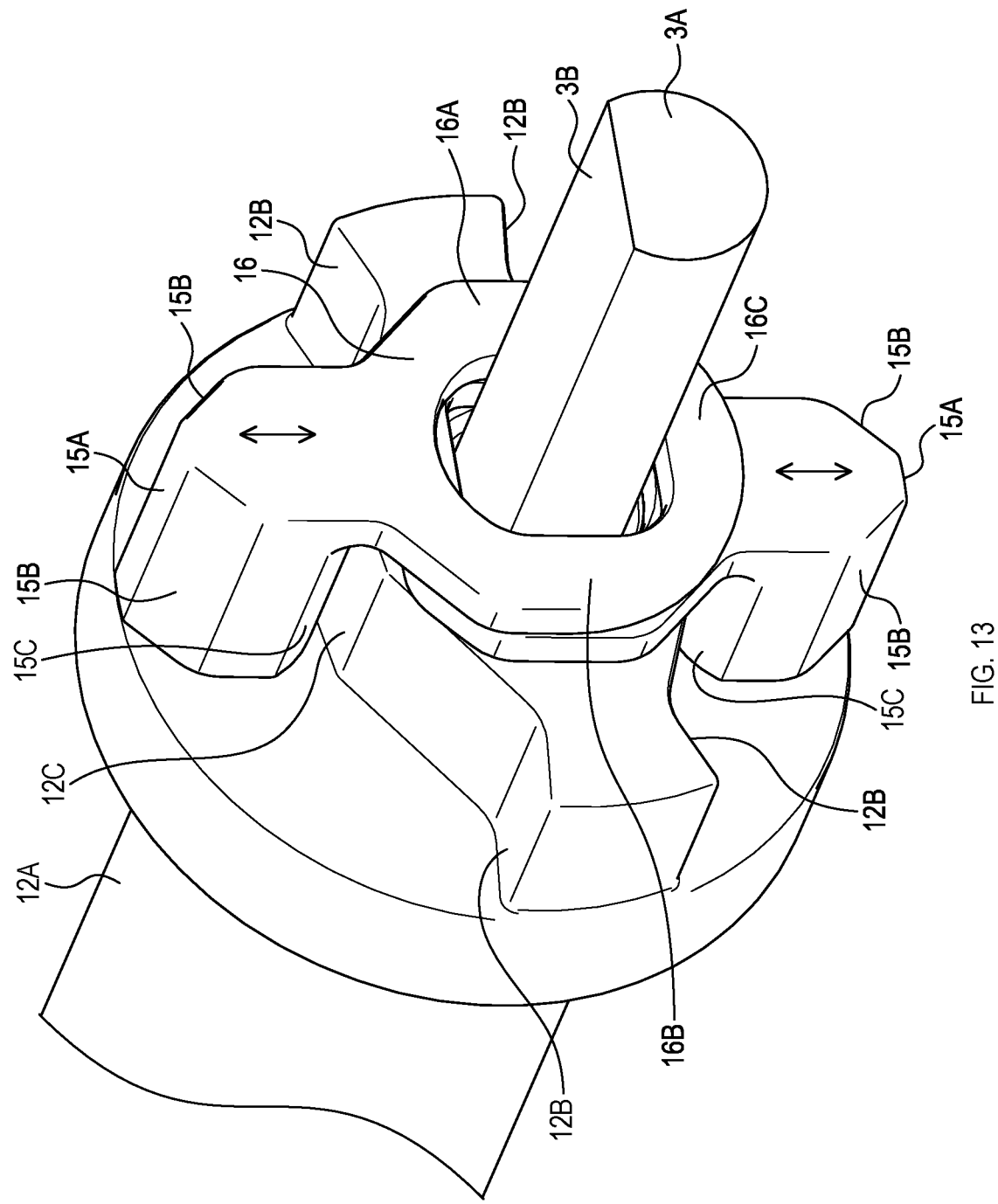
FIG. 13 is a diagram of the wedge member and others in the first embodiment.

As shown in FIG. 13, the respective holders 16 of the wedge members 15 at least partly overlap with each other in the axial direction. In the present embodiment, the two annular bodies formed by the respective first fork blades 16A, second fork blades 16B, and joining portions 16C overlap with each other in the axial direction.

2. Operation of One-Way Coupling and Its Feature Thereof

Referring to FIG. 8, for example, when a drive force in a clockwise direction (the direction illustrated in this figure) is inputted to the input-side rotation portion 11, the input-side protrusion 11B and the output-side protrusion 12B are engaged, and thus the pressing force F1 from each open cam 11E is received by the corresponding first follower part 15B, thereby to displace the wedge member 15 to the unlocked position. Accordingly, the drive force is transmitted from the input-side rotation portion 11 to the output-side rotation portion 12.

In contrast, for example, when a reverse rotational force in a counterclockwise direction as shown in FIG. 9 is inputted to the output-side rotation portion 12, a pressing force F3 from each pressure-contact cam 12C is received by the corresponding second follower part 15C, thereby to displace the wedge member 15 to the locked position. As a result, a frictional force between the inner circumferential surface 14A and each pressure contact portion 15A inhibits the reverse rotational force from being transmitted to the input-side rotation portion 11. In addition, each pressure contact portion 15A bites into the inner circumferential surface 14A, thereby to inhibit the reverse rotational force from being transmitted to the input-side rotation portion 11.

Further, the wedge member 15 comprises a first follower part 15B and a second follower part 15C that are provided separately from each other. The wedge member 15 is displaced to the unlocked position by the first follower part 15B, and displaced to the locked position by the second follower part 15C. The one-way coupling 10 allows the first follower part 15B and the second follower part 15C each to be formed in a suitable shape.

The arrangement of the wedge member 15 is held by the holder 16. Thus, if the reverse rotational force is greater, each wedge member 15 is inhibited from rotating. This enables the frictional force between the inner circumferential surface 14A and each pressure contact portion 15A to be securely obtained. Also, this enables each pressure contact portion 15A to securely bite into the inner circumferential surface 14A. Therefore, the one-way coupling 10 achieves elimination of a component corresponding to the guide piece disclosed in Patent Document 1.

For example, as shown in FIG. 9, when the reverse rotational force in the counterclockwise direction (i.e., the direction illustrated in this figure) acts on the output shaft 12A, the wedge members 15 each attempt to rotate about a portion in the vicinity of respective contact areas between the second follower parts 15C and the pressure-contact cams 12C, in a direction of the pressing force F3.

However, in the present embodiment, the first fork blade 16A or the second fork blade 16B is latched on the input shaft 3A. This restricts rotation of each wedge member 15. In the example of FIG. 9, the first fork blade 16A is latched on the input shaft 3A.

In the one-way coupling 10, the respective holders 16 of the wedge members 15 at least partly overlap with each other in the axial direction. Accordingly, when the wedge members 15 are displaced to the locked position, any of the respective holders 16 is inhibited from being spaced apart from the input shaft 3A.

That is, in a hypothetical structure, two wedge members 15 (i.e., a first wedge member 15 and a second wedge member 15) are configured to each have a first fork blade such that leading ends of the respective first fork blades 16A abut each other and also that extending ends of the respective second fork blades 16B abut each other, dimensions of the first fork blade 16A and the second fork blade 16B in an extending direction each have to be made small.

Therefore, in the hypothetical structure above, when the two wedge members 15 are displaced to the locked position, one of the two holders 16 may be spaced apart from the input shaft 3A. In contrast, in the present embodiment, the two holders 16 at least partly overlap with each other in the axial direction.

This allows the dimensions of the first fork blade 16A and the second fork blade 16B in the extending direction to be greater than the diameter D of the input shaft 3A. As a result, even if the two wedge members 15 are displaced to the locked position, one of the two holders 16 is inhibited from being spaced apart from the input shaft 3A.

As shown in FIG. 12, the engagement surface 11D of the engagement hole 11C in the one-way coupling 10 is substantially perpendicular to a displacement direction of each wedge member 15 (see arrow directions in FIG. 11 to FIG. 13). Accordingly, in a state in which inhibition of displacement of the wedge member 15 is reduced, the input-side rotation portion 11 can be rotated integrally with the input shaft 3A.

Second Embodiment

Each holder 16 in the first embodiment comprises the first fork blade 16A, the second fork blade 16B, and the joining portion 16C, so as to form an annular body.

Figure 14A:
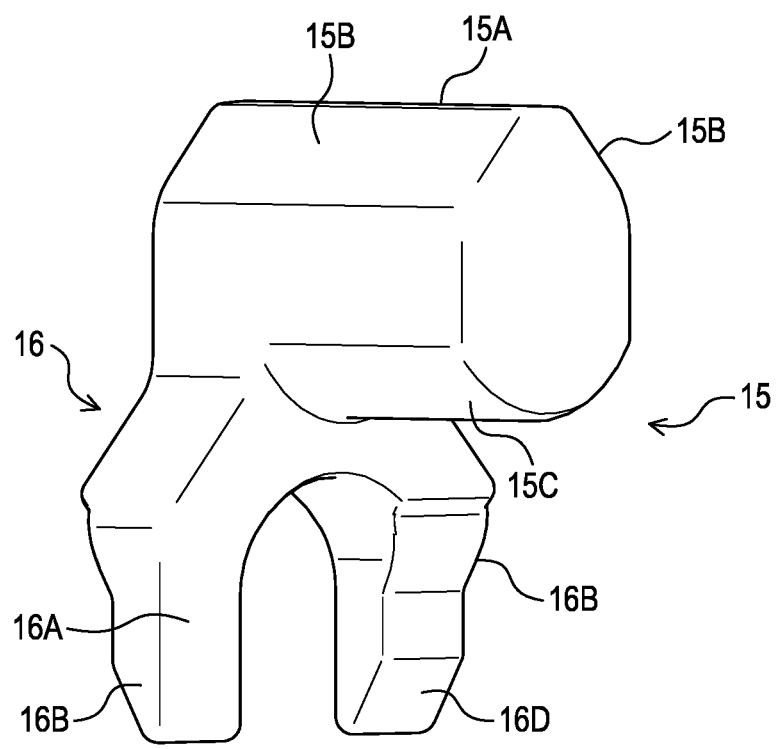
FIG. 14A is a diagram of a wedge member and others in a second embodiment.
Figure 14B:
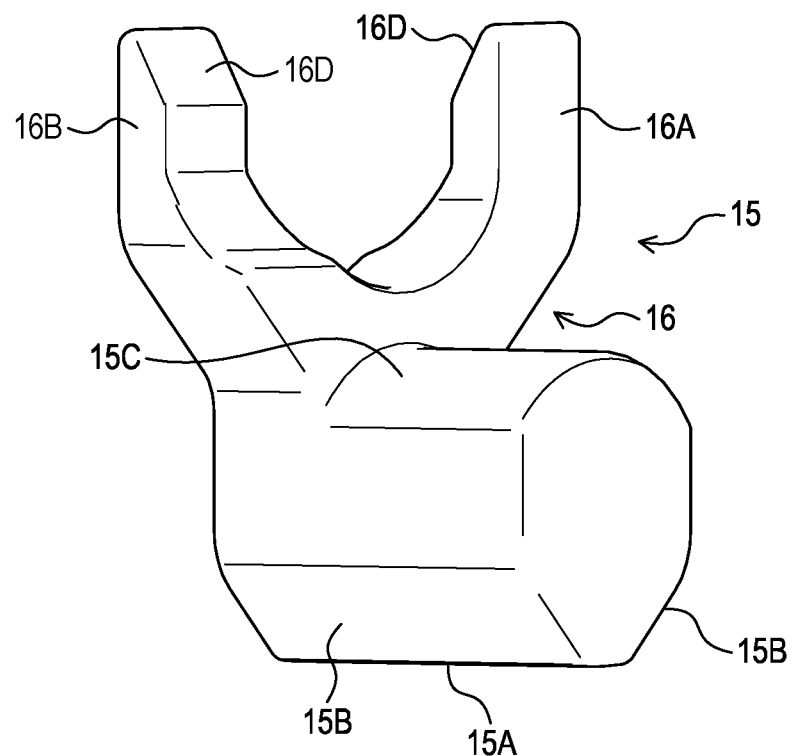
FIG. 14B is a diagram of the wedge member and others in the second embodiment.
Figure 15:
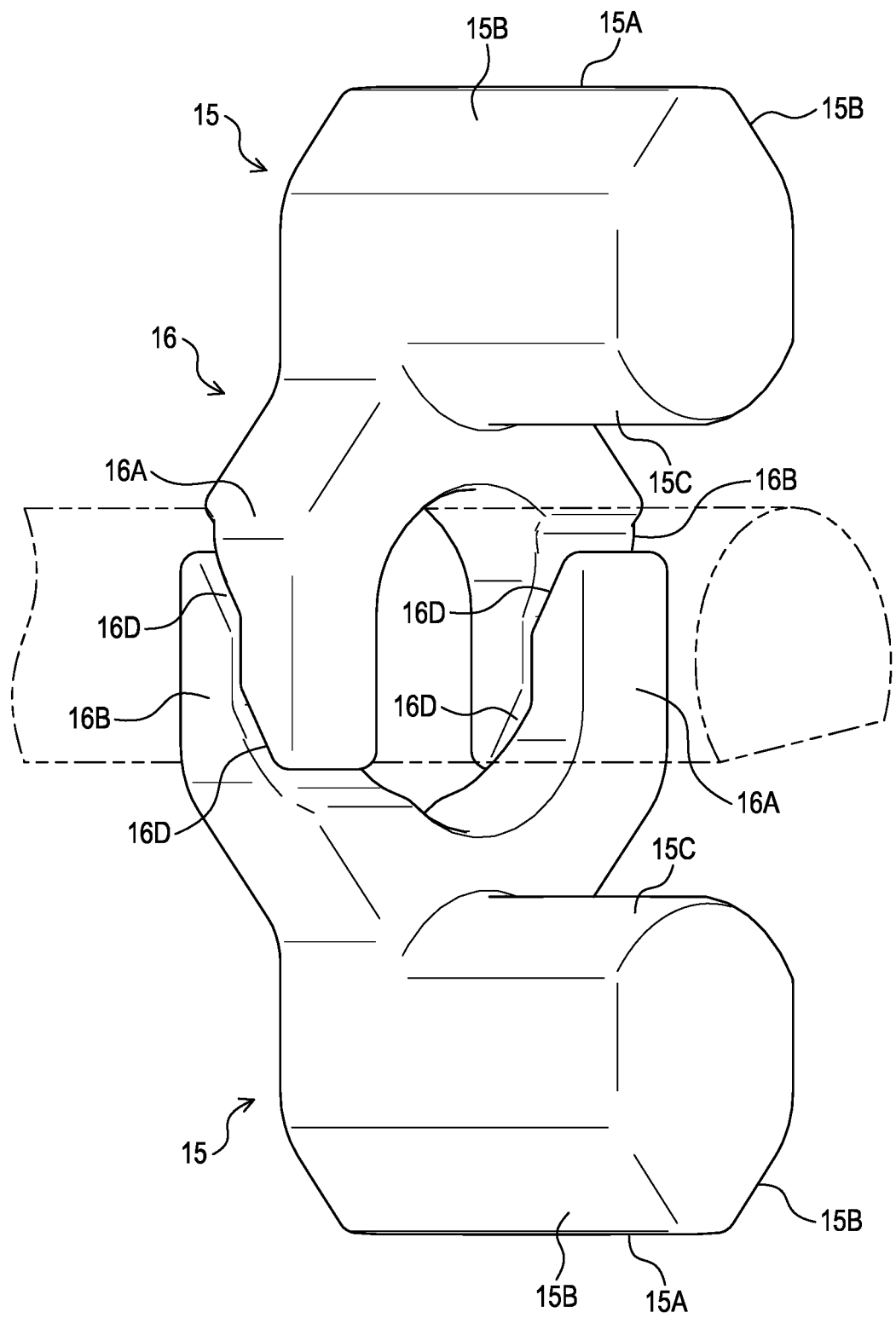
FIG. 15 is a diagram of the wedge member and others in the second embodiment.

However, as shown in FIG. 14A and FIG. 14B, each holder 16 of the second embodiment does not include the joining portion 16C. As shown in FIG. 15, the holder 16 comprises an inclined portion 16D. The inclined portion 16D is provided to an area where one leading end of the first fork blade 16A of one holder 16 and one leading end of the second fork blade 16B of the other holder 16 overlap with each other.

The description above explains differences from the one-way coupling 10 in the first embodiment. The same constituent elements and the like as in the aforementioned embodiment are denoted by the same reference numerals in the aforementioned embodiment, and duplicate description is not repeated in the present embodiment.

Other Embodiments

On the output-side rotation portion 12 in the aforementioned embodiments, the insertion hole 12D into which the input shaft 3A is inserted, is provided. However, the present disclosure is not limited by the embodiments. That is, for example, in a case in which the input shaft 3A is short, the present discloser does not require the insertion hole 12D.

The input shaft 3A in the aforementioned embodiment employs the rotor shaft of the electric motor 3. However, the present disclosure is not limited by the embodiments. That is, in the present disclosure, for example, the input shaft 3A may be provided separately from the rotor shaft.

In the aforementioned embodiments, the engagement surface 11D of the engagement hole 11C is substantially perpendicular to the displacement direction of each wedge member 15. However, the present disclosure is not limited by the embodiments. That is, in the present disclosure, for example, the engagement surface 11D may be parallel to the displacement direction of each wedge member 15.

In the aforementioned embodiments, the spacing dimension W between the first fork blade 16A and the second fork blade 16B is equal to or slightly greater than the diameter of the input shaft 3A, and also, the gap dimension H is greater than the diameter D of the input shaft 3A. However, the present disclosure is not limited by the embodiments.

In the aforementioned embodiment, the first fork blade 16A or the second fork blade 16B is latched on the input shaft 3A, thereby to restrict rotation of each wedge member 15. However, the present disclosure is not limited by the embodiments.

In the aforementioned embodiments, a vehicle seat according to the present disclosure is applied to an automobile. However, the application of the present discloser is not limited to automobiles. That is, the present disclosure can be applied to seats used in other vehicles such as railroad vehicles, ships, boats, and aircrafts, and to stationary seats used in theaters and at homes, and other places.

Furthermore, the present disclosure is only required to conform to the gist of the disclosure described in the above-described embodiments, and thus is not limited to the aforementioned embodiments. Accordingly, the present disclosure may be configured in combination of at least two of the aforementioned embodiments, or may be configured without some of the components illustrated in the drawings or described with reference numerals in the aforementioned embodiments.

What is claimed is:

1. A one-way coupling, comprising:
an input shaft to which a drive force is inputted; and
an output shaft that outputs the drive force,
wherein the one-way coupling is configured to transmit the drive force from the input shaft to the output shaft, and inhibit the drive force inputted to the output shaft from being transmitted to the input shaft,
the one-way coupling further comprising:
a transmitter comprising:
an input-side protrusion rotating integrally with the input shaft, and
an output-side protrusion rotating integrally with the output shaft, the input-side protrusion and the output-side protrusion being engaged with each other when the drive force is inputted to the input shaft, thereby to transmit the drive force from the input shaft to the output shaft;
an immovable ring held in a non-rotatable state;
a pressure-contact cam rotating integrally with the output shaft;
a first wedge member displaceable between a locked position and a unlocked position, the first wedge member being brought into pressure contact with a circumferential surface of the immovable ring at the locked position, the pressure contact being released at the unlocked position, the first wedge member receiving a pressing force from the pressure-contact cam when the drive force is inputted to the input shaft, thereby to be displaced to the locked position; and
a first holder provided to the first wedge member, and holding an arrangement of the first wedge member when the drive force is inputted to the output shaft.

2. The one-way coupling according to claim 1, wherein the first holder is latched on the input shaft, thereby to hold the arrangement of the first wedge member when the drive force is inputted to the output shaft.

3. The one-way coupling according to claim 2, further comprising:
a second wedge member arranged on a side opposite to the first wedge member to interpose the input shaft; and
a second holder provided to the second wedge member, the first holder and the second holder partly overlapping with each other in an axial direction of the input shaft.

4. The one-way coupling according to claim 1, wherein the first holder is formed in a shape of a bicycle front fork, and comprises a first fork blade and the second fork blade to interpose the input shaft therebetween, the first fork blade being situated on one side of the input shaft in a radial direction, the second fork blade being situated on the other side of the input shaft in the radial direction.

5. The one-way coupling according to claim 4, further comprises a joining portion that couples a leading end of the first fork blade and a leading end of the second fork blade.

6. The one-way coupling according to claim 5,
wherein at least one of the first fork blade and the second fork blade is slidable on the input shaft in the radial direction, and
wherein a gap dimension between the joining portion and a portion opposite thereto is greater than an external dimension of the input shaft, the input shaft being interposed therebetween.

7. The one-way coupling according to claim 1, wherein the input-side protrusion comprises an open cam that comes into contact with the first wedge member when the drive force is inputted to the input shaft, and thereby the first wedge member is displaced to the unlocked position.

8. The one-way coupling according to claim 1,
wherein the output-side protrusion and the pressure-contact cam are formed integrally with the output shaft, the output shaft comprising a circular hole into which the input shaft is rotatably inserted,
wherein the input-side protrusion is provided to a drive ring that rotates integrally with the input shaft, the drive ring comprising an engagement hole, the input shaft passing through the engagement hole to be engaged with the engagement hole, and
wherein an engagement surface defining the engagement hole is substantially perpendicular in a displacement direction of the first wedge member.

* * * * *